March 12, 1929.  P. G. PATER  1,704,808
POWER SHEARS
Filed March 23, 1927
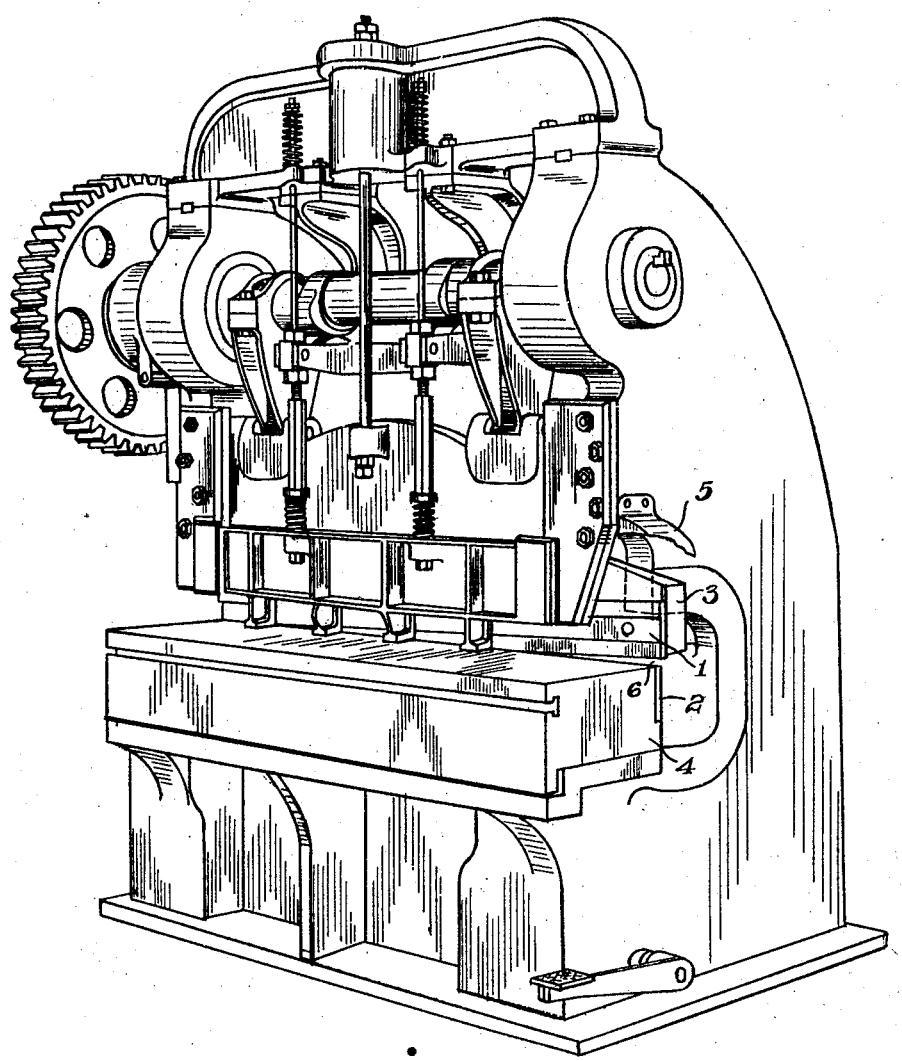
INVENTOR.
Paul G Pater
BY
ATTORNEY Patented Mar. 12, 1929.

1,704,808

UNITED STATES PATENT OFFICE.

PAUL G. PATER, OF HAMILTON, OHIO, ASSIGNOR TO THE LONG & ALLSTATTER COMPANY, OF HAMILTON, OHIO.

POWER SHEARS.

Application filed March 23, 1927. Serial No. 177,537.

This invention relates to improvements in power shears.

In power shears of ordinary construction the length of the shear blades is approximately equal to the working width of the opening through the machine for the movement of the stock. The width of stock that can be sheared in normal operation of the machine is limited, therefore, to the width of the opening, and to sever the stock in a single operation, it is necessary that the ends of the shear blades fully close at the finishing end of the cut, it being understood that the upper blade has a rake, or is set at an angle to the horizontal.

On account of this arrangement for full closing of the shear blades, it is necessary for shearing stock wider or longer than the length of the blades and requiring successive cuts for severing the sheet, to alter the normal operation of the machine to prevent nicking or tearing of the stock by the end or corner of the upper blade as it penetrates the sheet at the end of the cut. Such an adjustment of the machine is usually made by disposing a tapered wedge inversely over the upper blade for preventing full closing of the blades, or in other words, to shorten the cut. This may also be accomplished by effecting an adjustment in the travel of the ram which operates the upper blade. Such adjustments, however, require considerable time and are more or less unsatisfactory and undesirable, being a departure from the normal operation of the machine and likely to result in injury to the mechanism.

The objects attained in the invention consist in an arrangement of the shear blades for cutting stock the full working width of the machine without complete closing of the ends of the blades at the end of the cut, and for effecting a continuous cut by successive operations without complete closing of the blades on wide or long stock moved parallel with the blades, the successive cuts being made without nicking or tearing the stock at the ends of the cuts.

The figure of the accompanying drawing serves for illustrating the invention as applied to a standard power shears. The improvements consist in extending the shear blades 1—2 at the ends which meet last in the shearing operation beyond the width of the machine, the blade supporting members 3—4 being in like manner extended beyond the side of the machine frame. A housing 5 serves as a guard over the extended ends of the blades, the housing being broken away to show the relation of one blade to the other at the ends.

Power shears embodying the invention function the same as ordinary shears for cutting stock that will pass through the machine, except that the ends of the blades, as indicated at 6, do not come together at the end of the cut. Machines so equipped will be adapted as well, without effecting alterations in their operation, for cutting wider or longer sheets by successive operations, the successive cuts being made as the sheets are moved parallel with the blades, without the ends of the blades coming together at the finishing ends of the cuts, and thus without nicking or tearing the stock.

To this end also the frame of the machine adjacent the extended ends of the shear blades is provided with suitable clearance for the blades and for moving the stock to the blades. The work bed, to which the lower shear blade is fixed, extends well forward of the blades and laterally of the machine, as stated, along the extended ends of the blades, for supporting the stock for shearing.

As far as I am aware, the invention is the first of its kind in any form in this art. I wish to claim the invention, therefore, broadly as to the principle of the extended blades with the non-closing feature of their ends, as well as the structural embodiment of the invention herein shown and described.

Having described my invention, I claim:

1. A machine for shearing stock transversely and longitudinally of a sheet including a frame having an opening permitting of moving stock lengthwise through the machine and having clearance adjacent said opening permitting of moving stock lengthwise transversely of the opening, shear blades spanning the opening, and extended on one side of the machine beyond the opening, the extended ends of the blades being out of engagement one with the other in their closed relation, whereby stock moved through said opening will be sheared by one operation and stock moved parallel with the blades may be seared in a continuous cut by repeated operations.

2. A machine for shearing stock transversely and longitudinally of a sheet including a frame having an opening permitting of moving stock lengthwise through the machine and having clearance adjacent said opening permitting of moving stock transversely of the opening, a shearing bed forward of said opening and extended on one side of the machine along said clearance for supporting stock for shearing, shear blades spanning the opening and extended on one side along the extension of the shearing bed, the extended ends of the blades being out of engagement one with the other in their closed relation, whereby stock moved through said opening will be sheared in single operations and stock moved parallel with the blades may be sheared in a continuous cut longitudinally of the sheet by repeated operations.

In testimony whereof I have affixed my signature.

PAUL G. PATER.